United States Patent Office 3,238,095
Patented Mar. 1, 1966

3,238,095
**FUNGICIDES DERIVED FROM DIBENZOYL-
METHANE**
Jean Thiolliere and Daniel Pillon, Lyon, France, assignors to Pechiney-Progil, Societe pour le Developpement et la Vente de Specialites Chimiques, Paris, France
No Drawing. Filed Feb. 5, 1964, Ser. No. 342,786
Claims priority, application France, Feb. 5, 1963, 923,760
4 Claims. (Cl. 167—30)

It is a general object of this invention to provide improved compounds for use in the preventative and curative treatment of parasitic fungi.

It is a further object of this invention to provide compounds of the type described which can be easily and inexpensively prepared whereby they are particularly suitable for commercial use.

It is an additional object of this invention to provide compounds of the type described which possess a surprising activity against the parasitic fungi of wood, plants and textiles whereby they are effective for a wide variety of applications.

These and other objects of this invention will appear hereinafter, and it will be understood that the examples included herein are provided solely for purposes of illustration and not by way of limitation.

The process of this invention comprises bringing into contact with the plants or textiles to be protected an organic compound of the general formula:

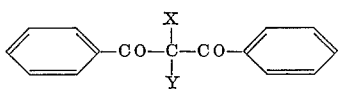

in which X and Y represent a radical —H, —F, —Cl, or —Br, and in which each of the benzene nuclei may optionally be substituted by, at most, three electronegative substituents such as —F, —Cl, —Br or —NO$_2$.

Applicants have found that dibenzoylmethane and the derivatives halogenated on the central carbon of dibenzoylmethane, which may if desired be substituted in the aromatic nuclei, possess a very considerable activity against the parasitic fungi of wood, plants and textiles. Their action is polyvalent and not limited to a particular species of parasitic fungi.

The preparation of compounds contemplated by this invention is easy and inexpensive. For example, the compounds may be prepared in two stages from industrial starting materials such as ethyl benzoate and acetophenone. By condensation of these two molecules, dibenzoylmethane is obtained, which may thereafter be reacted with a calculated quantity of halogen, whereby it is possible to attach, as desired, one or two halogen atoms to the central carbon of the propionic chain.

All the compounds of the class described have a remarkable destructive action upon parasitic fungi and the method of their manufacture is not a limiting aspect of the invention.

In a preferred embodiment of the invention, there is used as a fungicidal product the compound monobromodibenzoylmethane. This compound takes the form of white crystals melting at 93–94° C. and it has low toxicity on animals. Thus, the degree of acute toxicity on the male mouse is of the order of one gram per kilogram of animal when the product is directly injected into the esophagus in the form of a solution or suspension in oil.

The fungicidal products according to the present invention may be applied by dusting or spraying, with the products being provided in the form of a solution or suspension. The application is thus carried out in accordance with techniques currently employed in agriculture for the protection of plants. The concentration of the selected compound is preferably maintained between 0.5 and 5 grams per liter.

The following examples, which were carried out with the use of monobromodibenzoylmethane, are given by way of example and have no limiting character. Other derivatives differently substituted, as indicated in the foregoing, have comparable fungicidal properties.

Example 1

The effective concentration limits of monobromodibenzoylmethane on various fungi were tested, using the testing method described in the French standard NF 41–502, June 1955, which consists of bringing the parasites into contact with malt-impregnated paper strips and then with the fungicide to be tested. The effective concentrations for completely inhibiting the development of the parasitic fungus are the following:

*Sterigmatoscystis nigra*—effective concentration in the neighborhood of $1 \cdot 10^{-3}$
*Cladosporium herbarium*—effective concentration in the neighborhood of $1 \cdot 10^{-4}$
*Coriolus versicolor* — effective concentration between $1 \cdot 10^{-2}$ and $1 \cdot 10^{-3}$
*Coniophora cerebella* — effective concentration between $1 \cdot 10^{-2}$ and $1 \cdot 10^{-3}$
*Chaetomium globosum* — effective concentration in the neighborhood of $1 \cdot 10^{-3}$

Example 2

The fungicidal action of monobromodibenzoylmethane on grape mildew was studied on a surviving leaf, using the method described by H. Payen and H. Brebion (3rd International Congress of Phytopharmacy, Paris, September 1952, pages 56–65). It was found that the product exerts a complete fungicidal action on mildew, even in extremely weak concentrations, of the order of 5 parts per million.

Example 3

The following tests were carried out in greenhouses for studying the fungicidal action of monobromodibenzoylmethane suspensions:

The various plants treated were sprayed with a fungicidal mass containing 2 grams of active substance per liter:

(a) On tomatoes, with the aid of conidiae of phytophthora infestans, there is produced, 24 hours after treatment, an infection (by deposition of droplets of a titrated suspension of spores) on the treated leaves. The plants thus infected are placed in an incubation cell and, after six days, the positive points of infection are counted. While untreated tomato plants show 100% of the positive infections, the treated tomatoes have no infection.

(b) The same test is applied, *Alternaria solani* being substituted for *Phytophthora infestans*. The percentage of positive infections varies from 10% to 40% depending upon the plants, which shows that while there is a true fungicidal action against Alternaria, it is more limited than that obtained against mildew.

(c) On celery, the same type of test is again applied, the infection being carried out with *Septoria apii*. 100% infection occurs on untreated plants. No infection appears on the plants which have been sprayed with monobromodibenzoylmethane, either in a concentration of 2 grams per liter or in a reduced concentration of 1 gram per liter.

Among other compounds corresponding to the general formula, the dibromo derivatives (X=Y=Br), and the chlorobromo derivative (X=Cl, Y=Br) have about the same activity as monobromo derivative. The dibenzoylmethane (X=Y=H) is almost as effective, except against grape mildew.

Besides, if a benzene nucleus is substituted by a radical —Cl, particularly in para position, the activity against Oidium is considerably increased.

Active products are primarily used as emulsions, obtained from dispersion of wettable powders. Such powders are prepared in mixing from 5 to 90% of active products with a carrier such as kaolin, a wetting agent such as dodecylbenzene sulfonate and a dispersing agent such as cellulose bisulphite or lignosulfonate. The mixture very finely ground is easily dispersed in water when it is used.

The active product may be also solved in a solvent, for example xylene; the solution can be dispersed in water with an addition of emulsifying and dispersing agents.

At last, such dry powders may be used, as obtained grinding the active agent with an inert carrier, for example kaolin.

It will be understood that various changes and modifications may be made in the above described process which provide the characteristics of this invention without departing from the spirit thereof particularly as defined in the following claims.

That which is claimed is:

1. In a process for the treatment of parasitic fungi which attack wood, plants and textiles, comprising bringing into contact with the substance to be protected an organic compound of the formula

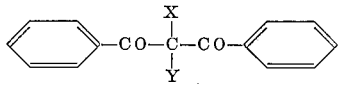

in which X and Y represent a radical selected from the group consisting of —H, —F, —Cl, and —Br.

2. A process in accordance with claim 1 wherein the compound employed is monobromodibenzoylmethane.

3. A process for the treatment of parasitic fungi which attack objects included in the group consisting of wood, plants and textiles comprising the steps of providing a material comprising from 0.5 to 5 grams per liter of an organic compound of the formula

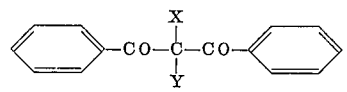

in which X and Y represent a radical selected from the group consisting of —H, —F, —Cl, and —Br and applying said material to said objects.

4. In a process for the treatment of parasitic fungi which attack wood, plants and textiles, comprising bringing into contact with the substances to be protected an organic compound based on the formula

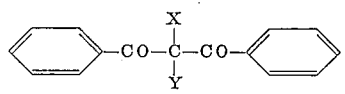

in which X and Y represent a radical selected from the group consisting of —H, —F, —Cl and —Br, and in which at least one of the benzene nuclei are substituted by an electro negative substituent selected from the group consisting of —F, —Cl, —Br and —NO$_2$.

References Cited by the Examiner

Chem. Abs., 44, 3568(d), 1950; 54, 12472(d), 1960.

JULIAN S. LEVITT, *Primary Examiner*.